United States Patent [19]

Freidel

[11] Patent Number: 4,903,397
[45] Date of Patent: Feb. 27, 1990

[54] PROCESS FOR PRODUCING A HEATING ELEMENT

[75] Inventor: Norbert Freidel, Waghäusel, Fed. Rep. of Germany

[73] Assignee: Friedrichsfeld GmbH Keramik- und Kunststoffwerke, Mannheim, Fed. Rep. of Germany

[21] Appl. No.: 330,201

[22] Filed: Mar. 29, 1989

[30] Foreign Application Priority Data

Mar. 30, 1988 [DE] Fed. Rep. of Germany ....... 3810845

[51] Int. Cl.$^4$ .............................................. H05B 3/00
[52] U.S. Cl. ...................................... 29/611; 219/544; 264/272.18; 425/117
[58] Field of Search ...................... 29/611; 264/272.15, 264/272.18; 425/117; 219/535, 544

[56] References Cited

U.S. PATENT DOCUMENTS

| 1,778,884 | 10/1930 | Bressan | 219/544 |
| 1,905,770 | 4/1933 | Walker et al. | 219/459 |
| 4,455,482 | 6/1984 | Grandclement . | |

FOREIGN PATENT DOCUMENTS

| 0069020 | 10/1984 | European Pat. Off. . | |
| 145581 | 6/1985 | European Pat. Off. . | |
| G 8521529.5 | 10/1985 | Fed. Rep. of Germany . | |
| 414523 | 8/1946 | Italy | 29/611 |
| 528697 | 11/1972 | Switzerland . | |
| 1408844 | 10/1975 | United Kingdom . | |

Primary Examiner—P. W. Echols
Attorney, Agent, or Firm—Foley & Lardner, Schwartz, Jeffery, Schwaab, Mack, Blumenthal & Evans

[57] ABSTRACT

A process for producing a heating element comprising a heating wire wound as a bifilar spiral and arranged in a plastic part that can be welded to a plastic pipe by supplying electric current to radially outwardly extending wire ends of the heating wire. The process can be implemented with little effort, and the apparatus for carrying out the process enables functionally reliable production of the heating element. The heating wire is arranged in a bifilar spiral groove in a surface of an injection mold with the windings of the heating wire spaced a distance corresponding to the radial spacing of the individual windings of the spiral groove. After closing the injection mold, plastic is introduced into preferably radial connecting grooves between the windings of the spiral groove so that the plastic at least partially surrounds the heating wire in the vicinity of the connecting grooves.

9 Claims, 3 Drawing Sheets

PROCESS FOR PRODUCING A HEATING ELEMENT

BACKGROUND OF THE INVENTION

This invention relates to a process for producing a heating element which is to be arranged in a plastic part and used to weld the plastic part to a plastic pipe, wherein the heating element comprises a heating wire wound as bifilar spiral with radially outwardly extending wire ends through which current can be supplied to the heating element. The invention relates furthermore to an apparatus for implementing the process of the invention.

A heating element which is used to weld a saddle piece or a tapping fitting of plastic to a pipe likewise consisting of plastic is disclosed in European Patent Application No. EP 069,020. The heating element contains a thin plate of plastic, the one surface of which has a spiral groove. Inserted in this spiral groove is the heating wire, which has a round cross section. The plate has two diametrically opposite projections with the ends of the heating wire, to which electric current is fed for welding from a welding appliance. One end of the heating wire or of the welding winding is led from the center of the plate radially outward to the assigned projection. The plate is provided with a strap which, after insertion of the welding winding into the spiral groove is placed over the welding winding, the inner end of the welding winding then being led radially outward via the strap to the projection. The strap is intended to prevent a short circuit during welding. The production of this known heating element involves significant expense, particularly with regard to the aforementioned strap. During welding, additional difficulties may arise due to excessive local heating in the vicinity of the strap or of the radial leadout of the wire end. An increased amount of heat, in comparison with the other regions of the welding winding, is namely supplied in this region through the radially outwardly extending wire. There is a risk of void formation and reduced welding quality. Furthermore, since the spiral welding winding is arranged in the groove of the plastic plate, the heating wire cannot bear directly against the surface of the pipe to be welded. Rather, the welding winding is spaced a distance, corresponding to the base thickness, from the pipe surface, and a correspondingly increased heating power must be supplied.

An electrically weldable shaped tapping piece of thermoplastic material is disclosed in Swiss Patent No. CH 528,697. This shaped tapping piece is produced by injection molding, with a sheathed resistance wire being placed into the injection mold before it is closed. This sheathed resistance wire has first been cast into a plate likewise consisting of thermoplastic material. In this plate, the windings of the sheathed resistance wire lie closely adjacent one another. The resistant wire may be wound as a single spiral or as a bifilar spiral, the spacing of the individual windings being defined by the wall thickness of the plastic sheathing. The winding spacing cannot be readily changed or optimized with regard to the necessary welding performance. A person skilled in the art is not given any other indication as to how to predetermine the spacing of the windings from one another other than by appropriate material thickness of the sheathing. Furthermore, due to the sheathing, the resistance wire is spaced a considerable distance from the surface of the pipe to be welded, so that a relatively high use of energy is necessary.

Finally, a shaped tapping piece with a heating wire mat is known from German Utility Model No. 85 21 529. To produce this heating wire mat, the heating wire provided with a plastic sheathing is arranged in zig-zag form, the individual parts of the heating wire mat lying closely adjacent one another. Subsequently, the closely adjacent parts of the heating wire are welded to one another. This welding can only be performed with plastic-sheathed heating wire. Here again the spacing of the individual regions of the heating wire depends on the wall thickness of the sheathing.

SUMMARY OF THE INVENTION

It is the object of the present invention to provide a process for producing a heating element which can be implemented with little effort and which facilitates efficient fabrication of a bifilar heating element arranged in a plastic part.

Another object is to provide a process for producing a heating element which does not require a lot of expensive equipment and which can be carried out with small amounts of material and energy.

A further object is to provide a process which enables production of heating element having the largest possible welding surface.

It is also an object of the invention to provide apparatus for implementing the process which is of simple design and facilitates functionally reliable production of large numbers of heating elements.

An additional object of the invention is to provide apparatus designed in such a way that it can be used to reliably produce a heating element which is optimized to the particular conditions under which it is to be used.

Yet another object of the invention is to provide a process for producing a heating element which facilitates functionally reliable welding and which assures as even a distribution as possible of the welding energy around the circumference.

A still further object of the invention is to provide a process for producing a heating element which assures a good heat transfer and which can be inexpensively produced.

These and other objects of the invention are achieved by providing a process for producing a heating element which is to be arranged in a plastic part and used to weld the plastic part to a plastic pipe, said heating element comprising a heating wire wound as bifilar spiral with radially outwardly extending wire ends through which current can be supplied to the heating element, said process comprising the steps of arranging said heating wire in a bifilar spiral groove in a surface of an injection mold with the windings of the heating wire spaced a distance corresponding to the radial spacing of the windings of the sprial groove, closing said injection mold, and introducing plastic into connecting grooves between the windings of said spiral groove so that the plastic at least partially surrounds the heating wire in the vicinity of said connecting grooves.

According to a further aspect of the invention the objects are achieved by providing an apparatus for producing a heating element wound as a bifilar spiral and arranged in a plastic part for use in welding said plastic part to a plastic pipe, said apparatus comprising an injection mold for said plastic part, said mold having a bifilar spiral groove in a mold surface thereof and at least one radial connecting groove intersecting said spiral groove.

The proposed process and apparatus make possible simple and reliable production of the heating element. The heating wire is placed into the bifilar spiral groove of the injection mold, and the connecting crosspieces between the individual windings of the heating element are subsequently produced with the same injection mold. The spacing of the individual windings can be predetermined according to requirements without difficulty and without having to take into consideration a diameter of a plastic sheathing. The amount of plastic used is minimal, a reliable fixing of the windings and stabilization of the entire heating element being achieved by the connecting crosspieces. The wire ends are desirably arranged together with contact pins on the radially outer ends of two of these connecting crosspieces. The heating element is distinguished by a simple design and ensures a functionally reliable welding. Due to the bifilar design of the spiral, an overlapping or coverage of the heating wire is avoided in a simple way. The heating element is advantageously produced by means of an injection mold which has two coaxial and interconnected spiral grooves, the radially inward ends of which are connected with each other. Furthermore, the injection mold has a plurality of connecting grooves which lead away in star-shaped form via the two spiral grooves. According to the invention, the connecting grooves have a greater depth than the spiral grooves and are used to produce connecting crosspieces between the individual turns of the bifilar spirals. Finally, the injection mold contains receiving bores for contact pins, which are connected to the respective end of the winding wire. The two receiving bores are advantageously arranged on the radially outer ends of two connecting grooves. Thus, a defined alignment of the contact pins with the welding winding is reliably assured.

It has proved to be particularly advantageous to provide flat wire for the heating element. The longer sides of the flat wire are in this case perpendicular to the winding plane of the bifilar spiral. The flat wire has a greater outside surface in comparison with a round wire of the same cross section, so that an even heating of the plastic is achieved. Use of enamelled wire for the heating element has proved to be advantageous in reducing susceptibility to short circuits.

A further advantage of the use of flat wire in comparison with round wire is that the intermediate spaces between two neighboring heating wires or windings are greater if flat wire is used, assuming cross-sectional areas of equal size. Added to this is the fact that, due to the two opposite relatively large surfaces of neighboring windings, a better heating of the plastic lying between the windings takes place than if round wire is used. The consequence of this is that the distance between the neighboring windings can be increased if flat wire is used, which has the result of a further increase in the intermediate spaces. With a heating element of the same size, this produces a greater welding surface, which the entire plastic area between the individual windings of the heating wire represents.

It should be noted that nowadays polyethylene is regularly used as plastic both for the connecting crosspieces and for the plastic part to be welded to a pipe. The invention is not restricted to the use of polyethylene, instead comparable thermoplastics and plastics suitable for welding can be used. It should also be noted that, after the production of the heating element, the latter is integrated into the plastic part, whether it is a tapping fitting, a saddle piece or the like, in a subsequent stage of the process, more particularly by insertion into the injection mold, by means of which the plastic part is then produced.

In one preferred embodiment, the distance of the wire ends on the contact elements from the radially inner windings is greater than within the spiral. The contact elements or contact pins are firmly anchored in the tapping fitting, the saddle piece or the like and maintain their position unchanged even during welding. On the other hand, during welding, the heating spiral can float up in the plastic turning into a plastic or liquid state. The proposed enlargement of the distance of the wire ends from the radially inwardly neighboring winding of the spiral prevents the possibility of a short circuit taking place in this area during welding.

Further important features and advantages will become apparent from a consideration of the following detailed description of an illustrative embodiment.

BRIEF DESCRIPTION OF THE DRAWINGS

The invention will be explained in further detail hereinafter with reference to the accompanying drawings in which.

DETAILED DESCRIPTION OF PREFERRED EMBODIMENTS

Figure 1:
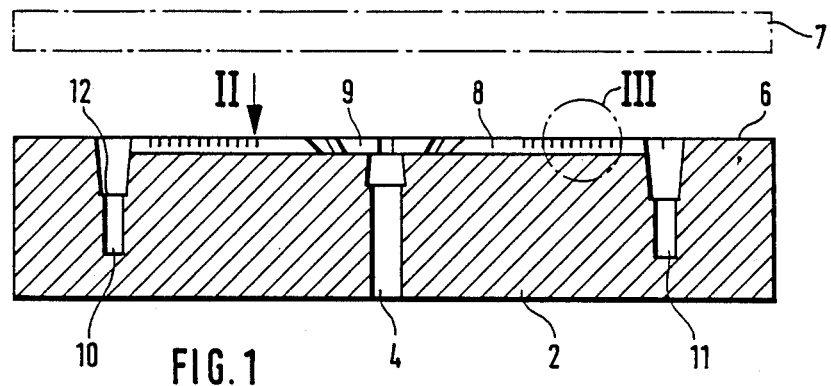
FIG. 1 shows a section through an injection mold for producing the heating element.

FIG. 1 shows a diagrammatic, axial sectional view of an injection mold 2, which has an axial bore 4 in the center through which plastic can be injected in a known manner for molding. During injection, the surface 6 is closed off by an upper part 7, which is designed as a plate or the like. In the surface 6, the injection mold 2 has a number of radial connecting grooves 8, arranged in star-shaped form. The central bore 4 ends in a circular depression 9 of the surface 6. This depression 9 is used for distribution of the plastic fed through the bore 4 into the connecting grooves 8, which open out into the depression 9. At the radially outer ends of the connecting grooves 8, shown in section in FIG. 1, there are arranged two receiving bores 10, 11. The receiving bores 10, 11 are upwardly of conical design and include a step 12 approximately in the middle. By virtue of the step 12, the receiving bores 10, 11 have a lower, essentially cylindrical part and also an upper part opening conically toward the surface 6. The lower part serves to receive and align an essentially cylindrical contact pin which is inserted. After insertion of the contact pin, it protrudes partially also into the upper widened part and is connected in an appropriate manner there to the ends of the heating wire. The upper parts of the receiving bores 10, 11 are used in each case to produce a projection in which the contact pin is anchored. The receiving bores 10, 11 are each located at the end of a respective one of the connecting grooves 8, so that the plastic can also pass into these receiving bores 10, 11 during injection and the contact pin located there as well as the connecting area with the wire end of the heating wire is surrounded with the injected plastic. The plastic may alternatively also be directed via a central bore in the upper part 7 into the depression 9 and into the connecting grooves 8.

Figure 2:
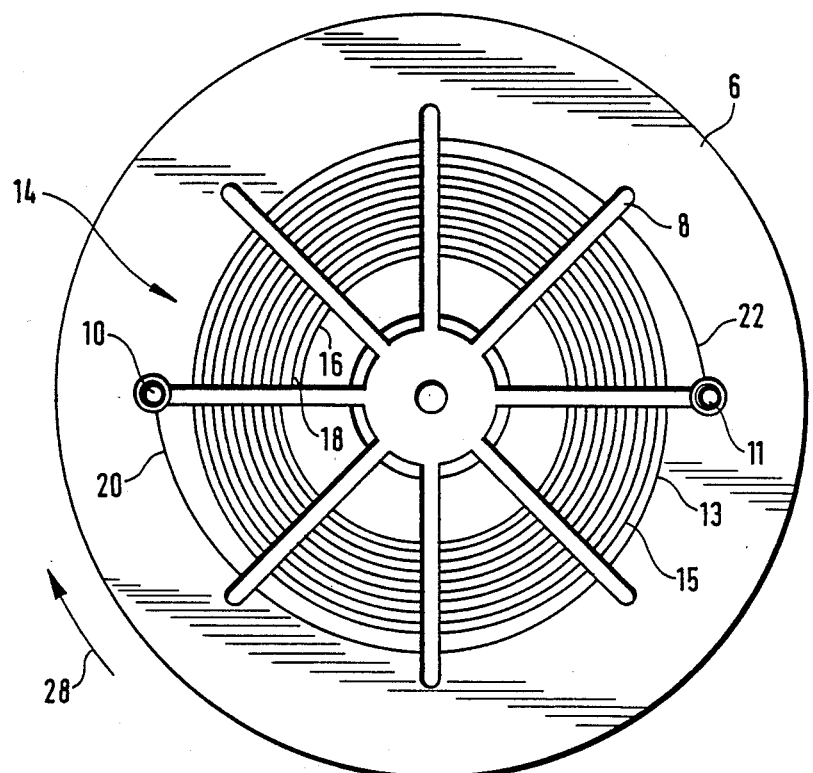
FIG. 2 shows a plan view of the injection mold in viewing direction II according to FIG. 1.

The plan view according to FIG. 2 shows the bifilar spiral groove 14 in the mold surface. This spiral groove 14 thus has two interconnected, coaxial spirals or turns, 13, 15, the radially inner ends 16, 18 of the two turns 13, 15 opening out into one of the connecting grooves 8. The radially outer ends 20, 22 of the two turns each extend, on the other hand, to one of the receiving bores 10, 11. As can be seen, the receiving bores 10, 11 and the outer ends 20, 22 are spaced a greater distance from the respectively radially inner neighboring windings of the spiral than the individual windings otherwise are spaced from each other.

Figure 3:
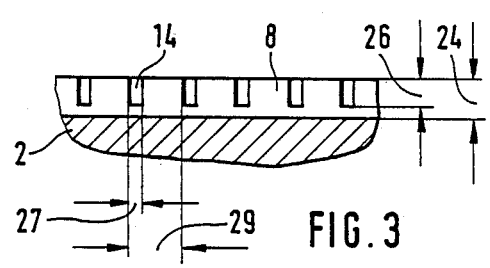
FIG. 3 shows an enlarged detail view III according to FIG. 1.

FIG. 3 shows an enlarged view of the cutout III according to FIG. 1, clearly revealing the rectangular cross section of the individual turns of the bifilar spiral groove 14. The radial connecting groove 8 has a depth 24 which is greater than the depth 26 of the spiral groove 14. As a result, it is possible to produce radially continuous connecting crosspieces by means of the connecting grooves 8. The depth 26 of the groove 14 is greater than the width 27. The groove 14 serves to receive the heating wire of rectangular cross section. The rectangular heating wire is also referred to hereinafter as flat wire. The cross-sectional area of the flat wire is desirably made smaller in such a way that the flat wire can be placed in the spiral groove 14 with an easy fit. Once the flat wire has been inserted, it bears with one of its narrow side surfaces against the groove base, the other short side surface lying essentially on the same level as the surface 6 of the injection mold 2. After injection, the plastic of the connecting crosspiece embraces the flat wire on the two longer outer sides. The radial spacing 29 of neighboring windings can be predetermined according to the required heating power and/or further welding conditions, for example the material properties of the plastic part and of the plastic pipe which are to be welded. The spacing 29 is greater than the width 27 of the spiral groove 14 by a predeterminable factor. The spacing 29 is advantageously greater than the groove width 27 by a factor between 2-8 and in particular between 3-6.

At the beginning of the production of a heating element, first of all one end of the heating wire, which has a rectangular cross section and is designed as a flat wire, is connected to a contact pin (not shown here in further detail). The connection is advantageously made by wire wrapping. The contact pin is, for example, inserted into the receiving bore 10. The heating wire is placed, according to FIG. 2, beginning from the outer end 20, into the first turn 13 of the bifilar spiral 14. At the same time, a relative rotation of the injection mold 2 takes place with respect to a feeding device (not shown here in further detail) for the heating wire, i.e. in the direction of the arrow 28. This rotation is ended when the heating wire has reached the radially inner end 16 at the radial connecting groove 8 there. In the connecting groove 8, the wire is then bent around into the inner end 18 of the other turn of the bifilar spiral groove 14. The direction of rotation of the mold is then reversed until the other outer end 22 is reached. After this, the wire end has the other contact pin connected to it, which is inserted into the receiving bore 11. After closing of the injection mold, i.e. after placing the upper part 7 onto the surface 6 with the aid of suitable moving and connecting means, plastic is introduced through the central bore 4 and distributed into the connecting grooves 8 up to the two receiving bores 10, 11. Under the influence of heat and/or pressure, the heating wire located in the spiral groove is surrounded at least partially by the plastic and embedded in the plastic in the vicinity of the connecting grooves 8. After cooling and opening of the injection mold, the heating element can be removed.

Figure 4:
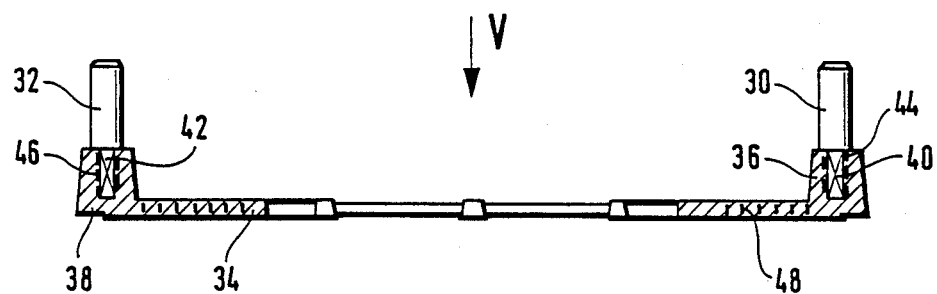
FIG. 4 shows a sectional view through the heating element.

FIG. 4 shows a section through the finished heating element, now also revealing the two contact pins 30, 32. The sectional plane runs through radial connecting crosspieces 34, which each have a projection 36, 38 at the radially outer end. In the projections 36, 38, the aforementioned contact pins 30, 32 are anchored by their lower parts 40, 42. These lower parts 40, 42 have a rectangular cross section and are connected to the ends 44, 46 of the heating wire 48 by wire wrapping.

Figure 5:
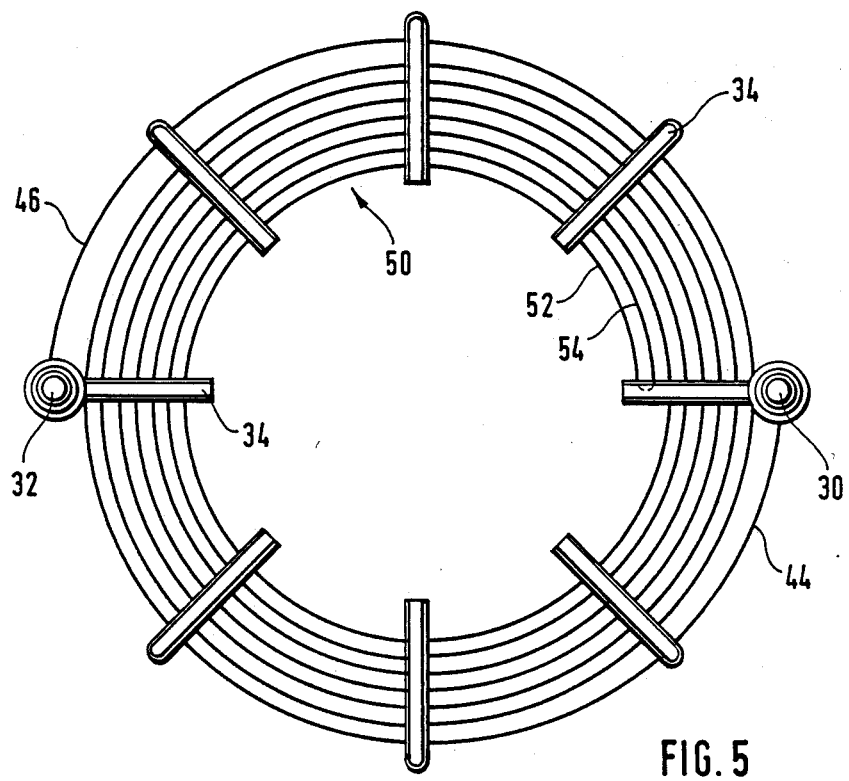
FIG. 5 shows a view of the heating element in viewing direction V according to FIG. 4.

FIG. 5 shows a plan view of the heating element, now clearly showing the total of eight radial connecting crosspieces 34 as well as the contact pins 30, 32 and the bifilar winding 50 of the heating wire 48. The contact pins 30, 32 are arranged diametrically opposite each other on the outside on two of the connecting crosspieces 34 in the projections 36, 38 provided there. Furthermore, the inner ends 52, 54 of the two parts of the bifilar winding spiral 50 can be seen. It should be noted expressly that the two ends 52, 54 are produced from the same wire simply by bending around or reversing the direction of rotation during insertion into the injection mold. The outer wire ends 44, 46 and, correspondingly, the contact pins 30, 32 have an increased distance from the next radially inwardly neighboring winding, in order to avoid a short circuit due to floating up of the winding 50 during welding.

The advantages which can be achieved by the use of flat wire in comparison with round wire are explained with reference to FIGS. 6-8. It should first of all be assumed that, if the heating wire is designed with a circular cross-sectional area, the windings are spaced a distance "x" from each other, a spacing "a" being maintained according to FIG. 6. For the sake of simplicity, shown here are only two windings of the heating wire of the heating element, which is already embedded in the plastic of the plastic part 62 which is to be welded. As already stated, the heating element fabricated according to the invention is embedded completely in the plastic of the plastic part during its production.

Figure 6:
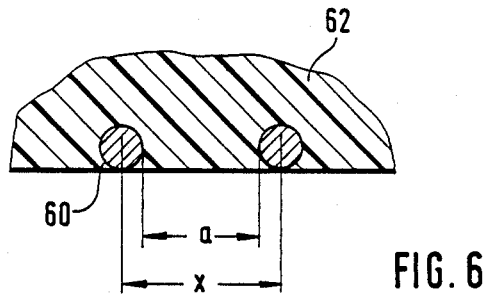
FIGS. 6 through 8 are diagrams which illustrate the advantages of the invention.
Figure 7:
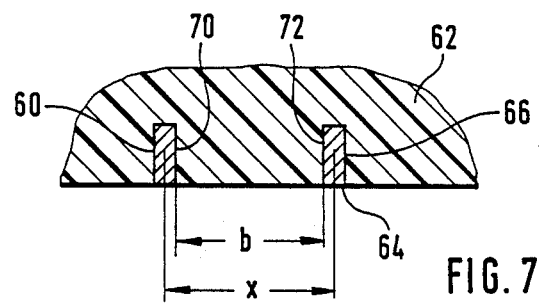
Figure 8:
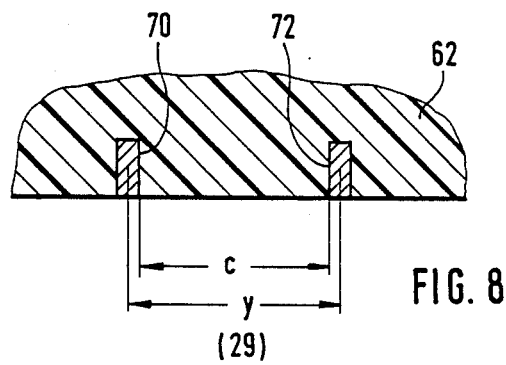

FIG. 7 shows, similarly to FIG. 6, two neighboring windings of the heating wire now designed as a flat wire having a rectangular cross section. The cross-sectional area is intended to be the same as in the case of the round wire according to FIG. 6. The flat wire is wound in such a way that the short side edges 64 are parallel to the winding plane, while the longer side edges 66 are orthogonal to the winding plane. With the same center-to-center distance "x" between neighboring windings, now the spacing "b" of the opposite surfaces 70, 72 is visibly greater than the corresponding spacing "a" in the case of the round wire according to FIG. 6. Furthermore, since the surfaces 70, 72 are larger than in the case of the round wire, the plastic lying between these surfaces 70, 72 is heated better than in the case of the round wire. Consequently, an increased distance "y" can be predetermined (FIG. 8) between the neighboring windings, so that the spacing "c" of the intermediate space between neighboring windings is also correspondingly increased. As can be seen, the use of flat wire in a heating element of otherwise equal size therefore allows an increased welding surface to be achieved in comparison with round wire. As used herein the term "welding surface" is intended to refer to the sum of all the areas filled with plastic between the individual windings of the heating wire. The spacing "c" according to FIG. 8 is greater than the spacing "b" according to FIG. 7, the spacing "b" in turn being greater than the spacing "a" according to FIG. 6.

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with reference to the appended claims and equivalents.

What is claimed is:

1. A process for producing a heating element which is to be arranged in a plastic part and used to weld the plastic part to a plastic pipe, said heating element comprising a heating wire wound as bifilar spiral with radially outwardly extending wire ends through which current can be supplied to the heating element, said process comprising arranging said heating wire in a bifilar spiral groove in a surface of an injection mold with the windings of the heating wire spaced a distance corresponding to the radial spacing of the windings of the spiral groove, closing said injection mold, and introducing plastic into connecting grooves between the windings of said spiral groove so that the plastic at least partially surrounds the heating wire in the vicinity of said connecting grooves.

2. A process as claimed in claim 1, wherein said connecting grooves are radial grooves.

3. A process as claimed in claim 1, wherein a flat wire is placed into the spiral groove as heating wire in such a way that the longer sides of the flat wire are orthogonal to the winding plane.

4. A process as claimed in claim 3, wherein said wire is an enamelled wire.

5. A process as claimed in claim 1, wherein one heating wire end is disposed in a radially outer receiving bore of said injection mold, said heating wire is subsequently arranged in a first turn of said bifilar spiral groove, after reaching the radially inner end of said first turn the heating wire is bent around into the radially inner end of the other turn of said spiral groove, and after insertion of said heating wire into said other turn of said spiral groove, the other wire end is inserted into a second receiving bore in said injection mold.

6. A process as claimed in claim 5, wherein a contact pin is first fastened to said one wire end of said heating wire, and after insertion of said heating wire into said spiral groove, a further contact pin is fastened to the other wire end.

7. A process as claimed in claim 5, wherein the bending around of said heating wire takes place at the radially inner ends of the two turns of said bifilar spiral groove in the vicinity of a radial connecting groove.

8. A process as claimed in claim 7, wherein during insertion of said heating wire into said injection mold, the mold is first rotated about an axis in one direction, and after the bending around of said heating wire at said inner ends, the mold is rotated in a direction opposite to said one direction.

9. A process as claimed in claim 8, wherein said axis runs through a central bore of said mold.

* * * * *